(12) United States Patent
Moehrle et al.

(10) Patent No.: US 12,542,420 B2
(45) Date of Patent: Feb. 3, 2026

(54) DWDM INTRA-CAVITY LASER DEVICE

(71) Applicant: Fraunhofer-Gesellschaft zur Foerderung der angewandten Forschung e.V., Munich (DE)

(72) Inventors: Martin Moehrle, Berlin (DE); Moon-Hyeok Lee, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 788 days.

(21) Appl. No.: 17/839,176

(22) Filed: Jun. 13, 2022

(65) Prior Publication Data
US 2022/0320825 A1 Oct. 6, 2022

Related U.S. Application Data (63) Continuation of application No. PCT/EP2020/086482, filed on Dec. 16, 2020.

(30) Foreign Application Priority Data

Dec. 17, 2019 (EP) ..................................... 19217129

(51) Int. Cl.
*H01S 5/068* (2006.01)
*H01S 5/06* (2006.01)
(Continued)

(52) U.S. Cl.
CPC ........ *H01S 5/06821* (2013.01); *H01S 5/0612* (2013.01); *H01S 5/06256* (2013.01);
(Continued)

(58) Field of Classification Search
CPC ..................... H01S 5/142; H01S 5/141; H01S 5/1028–1032; H01S 5/06256; H01S 5/12–125
See application file for complete search history.

(56) References Cited

U.S. PATENT DOCUMENTS

| | | | | |
|---|---|---|---|---|
| 4,896,325 A | * | 1/1990 | Coldren | .................. H01S 5/125 |
| | | | | 372/29.016 |
| 6,580,532 B1 | * | 6/2003 | Yao | .......................... H03L 7/04 |
| | | | | 398/192 |

(Continued)

FOREIGN PATENT DOCUMENTS

| | | | |
|---|---|---|---|
| JP | 5515447 B2 | * | 6/2014 |
| JP | 2017098362 A | * | 6/2017 |

(Continued)

OTHER PUBLICATIONS

Andreou Stefanos et al., "Monolithically integrated InP-based DBR lasers with an intra-cavity ring resonator", Optics Express, vol. 27, No. 19, 26281-26294 (2019), XP009520820.

(Continued)

*Primary Examiner* — Joshua King
(74) *Attorney, Agent, or Firm* — PERKINS COIE LLP; Michael A. Glenn (57) ABSTRACT

The present invention concerns a tunable Dense Wavelength Division Multiplex (DWDM) intra cavity laser device having a first optical wave guide having a first optical grating section, a second optical wave guide having a second optical grating section, an active gain section spatially separated from the second optical grating section and a phase section, and a DWDM-filter having an intra-cavity ring resonator located between the first optical wave guide and the second optical wave guide for coupling optical waves between the first and second optical wave guides. The tunable laser device is tunable in a discrete manner depending on a length of the ring resonator that is selected such that the free spectral range of the ring resonator matches a predetermined fixed wavelength spacing grid.

13 Claims, 5 Drawing Sheets

(51) Int. Cl.
  *H01S 5/0625* (2006.01)
  *H01S 5/10* (2021.01)
  *H01S 5/125* (2006.01)
  *H01S 5/14* (2006.01)

(52) U.S. Cl.
  CPC ............ *H01S 5/1032* (2013.01); *H01S 5/125* (2013.01); *H01S 5/142* (2013.01)

(56) References Cited

U.S. PATENT DOCUMENTS

| | | | | |
|---|---|---|---|---|
| 6,728,279 | B1* | 4/2004 | Sarlet | H01S 5/06256 372/43.01 |
| 6,940,878 | B2* | 9/2005 | Orenstein | H01S 5/12 372/20 |
| 6,959,028 | B2 | 10/2005 | Jones | |
| 7,130,325 | B2* | 10/2006 | Oh | H01S 5/06256 372/96 |
| 8,964,806 | B2* | 2/2015 | Ensher | H01S 5/0014 372/38.07 |
| 9,136,672 | B2* | 9/2015 | Luo | B82Y 20/00 |
| 9,344,196 | B1 | 5/2016 | Mashanovitch et al. | |
| 9,939,663 | B2* | 4/2018 | Luo | G02F 1/011 |
| 10,826,272 | B2* | 11/2020 | Bovington | G02F 1/2257 |
| 2002/0105998 | A1* | 8/2002 | Ksendzov | H01S 5/1032 372/92 |
| 2003/0219045 | A1* | 11/2003 | Orenstein | H01S 5/1032 372/20 |
| 2004/0125833 | A1* | 7/2004 | Sarlet | H01S 5/06256 372/50.1 |
| 2004/0136412 | A1* | 7/2004 | Jones | G02B 6/12004 372/20 |
| 2004/0218638 | A1 | 11/2004 | Carter et al. | |
| 2005/0025199 | A1* | 2/2005 | Ma | H01S 5/141 372/20 |
| 2008/0198888 | A1* | 8/2008 | Arimoto | H01S 5/0424 359/344 |
| 2009/0092159 | A1* | 4/2009 | Kato | H01S 5/026 372/20 |
| 2009/0225796 | A1* | 9/2009 | Kato | H01S 5/12 359/260 |
| 2014/0153601 | A1* | 6/2014 | Doerr | H01S 5/125 372/44.01 |
| 2015/0215043 | A1* | 7/2015 | Debregeas | H04B 10/2575 398/79 |
| 2015/0222089 | A1* | 8/2015 | Jeong | H01S 5/14 359/346 |
| 2015/0236809 | A1* | 8/2015 | Dong | H04J 14/0307 398/79 |
| 2015/0333475 | A1* | 11/2015 | Blumenthal | H01S 5/0206 372/27 |
| 2016/0049767 | A1* | 2/2016 | Morton | H01S 5/142 372/99 |
| 2016/0156149 | A1* | 6/2016 | Takabayashi | H01S 5/142 372/6 |
| 2017/0353001 | A1* | 12/2017 | Takabayashi | H01S 5/1007 |
| 2018/0191134 | A1* | 7/2018 | Osinski | H01S 5/0612 |
| 2018/0261976 | A1* | 9/2018 | Menezo | H01S 5/0687 |
| 2019/0273358 | A1* | 9/2019 | Zhang | H01S 5/026 |
| 2020/0067274 | A1* | 2/2020 | Kurczveil | H01S 5/50 |
| 2020/0295537 | A1* | 9/2020 | Zilkie | H01S 5/124 |
| 2021/0057880 | A1* | 2/2021 | Mehta | H01S 5/1007 |
| 2021/0143609 | A1* | 5/2021 | Hiratani | H01S 5/125 |

FOREIGN PATENT DOCUMENTS

| | | | | |
|---|---|---|---|---|
| JP | 2017161765 A | * | 9/2017 | |
| JP | 2019062036 A | * | 4/2019 | ........ G02B 27/0977 |
| WO | WO-2008080171 A1 | * | 7/2008 | ........ G02B 6/12007 |
| WO | WO-2019002763 A1 | * | 1/2019 | .......... H01S 5/1032 |

OTHER PUBLICATIONS

B. Hammond et al., "Integrated Wavelength Locker for Tunable Laser Application", The 15th Annual Meeting of the IEEE Lasers and Electro-Optics Society, WO1 (2 pages).

C.H. Henry, "Theory of the linewidth of semiconductor lasers", IEEE. J. Quantum. Electron., (19820000), vol. 18, No. 2, pp. 259-264.

Finisar, Modulated Grating Y-Branch laser, https://www.laserdiodesource.com/laser-diode¬product-page/1528nm-1563nm-20mW-butterfly-tunable-Finisar (5 pages).

H. Ishii et al., "Narrow Spectral Linewidth Under Wavelength Tuning in Thermally Tunable Super-Structure-Grating (SSG) DBR Lasers", IEEEJ. Sel. Topics Quantum Electron., (19950000), vol. 1, No. 2, doi: 10.1109/2944.401222, pp. 401-407, XP000521104.

J. Bovington et al., "Athermal laser design", Opt. Express, (20140000), vol. 22, No. 16, doi:10.1364/OE.22.019357, pp. 19357-19364, XP055207104.

M. C. Larson, "Narrow linewidth tunable DBR lasers", 2016 International Semiconductor Laser Conference (ISLC, TUC2 (2016) (2 pages).

S. Cheung, "High-Speed, Directly-Modulated Widely Tunable 1310 nm Coupled Cavity Laser Via Multimode Interference", J. Light. Technol., (20190000), vol. 37, No. 9, doi:10.1109/JLT.2019.2898832, pp. 2133-2139, XP011718786.

S. Keyvaninia et al., "Demonstration of a heterogeneously integrated III-V/SOI single wavelength tunable laser", Optics Express, (Feb. 7, 2013), vol. 21, No. 3, doi:10.1364/OE.27.026281, pp. 3784-3792, XP055239784.

S. Latkowski et al., "Novel Widely Tunable Monolithically Integrated Laser Source", IEEE Photonics J., (20150000), vol. 7, No. 6, doi:10.1109/JPHOT.2015.2493722, XP011588931 (10 pages).

S. Matsuo, T. Segawa, "Microring-Resonator-Based Widely Tunable Lasers", IEEE J. Sel. Topics Quantum Electron., (19950000), vol. 15, No. 3, pp. 545-554.

T. Haber et al., "Tunable Erbium-Doped Fiber Ring Laser Precisely Locked to the 50-GHz ITU Frequency Grid", IEEE Photon. Technol. Lett., (20000000), vol. 12, No. 11, doi:10.1109/68.887659, pp. 1456-1458, XP000981062.

T. Komljenovic et al., "Widely-Tunable Ring-Resonator Semiconductor Lasers", Appl. Sci., (20170000), vol. 7, No. 7, p. 732 (21 pages).

V. Lal et al., "Extended C-Band Tunable Multi-Channel InP-Based Coherent Transmitter PICs", J. Light. Technol., (20170000), vol. 35, No. 7, doi:10.1109/JLT.2017.2670547, pp. 1320-1327, XP011645662.

Andreou Stefanos et al., "Radio-Frequency Signal Generation Using Actively Frequency Stabilised Monolithically Integrated InP-Based Lasers", 2019 21st International Conference on Transparent Optical Networks (ICTON), IEEE, (Jul. 9, 2019), doi:10.1109/ICTON.2019.8840572, pp. 1-4, XP033618275.

Andreou Stefanos et al, "An InP-Based DBR Laser with an Intra-Cavity Ring Resonator with 130 KHz Linewidth and 65 dB SMSR", 2018 IEEE International Semiconductor Laser Conference (ISLC), IEEE, (Sep. 16, 2018), ISLC.2018.8516188, pp. 1-2, XP033434254.

* cited by examiner

| ITU grid channels (100 GHz spacing) | | | | | |
|---|---|---|---|---|---|
| channel | frequency(GHz) | wavelength(nm) | channel | frequency(GHz) | wavelength(nm) |
| 1 | 190.100 | 1577.03 | 38 | 193.800 | 1546.92 |
| 2 | 190.200 | 1576.20 | 39 | 193.900 | 1546.12 |
| 3 | 190.300 | 1575.37 | 40 | 194.000 | 1545.32 |
| 4 | 190.400 | 1574.54 | 41 | 194.100 | 1544.53 |
| 5 | 190.500 | 1573.71 | 42 | 194.200 | 1543.73 |
| 6 | 190.600 | 1572.89 | 43 | 194.300 | 1542.94 |
| 7 | 190.700 | 1572.06 | 44 | 194.400 | 1542.14 |
| 8 | 190.800 | 1571.24 | 45 | 194.500 | 1541.35 |
| 9 | 190.900 | 1570.42 | 46 | 194.600 | 1540.56 |
| 10 | 191.000 | 1569.59 | 47 | 194.700 | 1539.77 |
| 11 | 191.100 | 1568.77 | 48 | 194.800 | 1538.98 |
| 12 | 191.200 | 1567.95 | 49 | 194.900 | 1538.19 |
| 13 | 191.300 | 1567.13 | 50 | 195.000 | 1537.40 |
| 14 | 191.400 | 1566.31 | 51 | 195.100 | 1536.61 |
| 15 | 191.500 | 1565.50 | 52 | 195.200 | 1535.82 |
| 16 | 191.600 | 1564.68 | 53 | 195.300 | 1535.04 |
| 17 | 191.700 | 1563.86 | 54 | 195.400 | 1534.25 |
| 18 | 191.800 | 1563.05 | 55 | 195.500 | 1533.47 |
| 19 | 191.900 | 1562.23 | 56 | 195.600 | 1532.68 |
| 20 | 192.000 | 1561.42 | 57 | 195.700 | 1531.90 |
| 21 | 192.100 | 1560.61 | 58 | 195.800 | 1531.12 |
| 22 | 192.200 | 1559.79 | 59 | 195.900 | 1530.33 |
| 23 | 192.300 | 1558.98 | 60 | 196.000 | 1529.55 |
| 24 | 192.400 | 1558.17 | 61 | 196.100 | 1528.77 |
| 25 | 192.500 | 1557.36 | 62 | 196.200 | 1527.99 |
| 26 | 192.600 | 1556.55 | 63 | 196.300 | 1527.22 |
| 27 | 192.700 | 1555.75 | 64 | 196.400 | 1526.44 |
| 28 | 192.800 | 1554.94 | 65 | 196.500 | 1525.66 |
| 29 | 192.900 | 1554.13 | 66 | 196.600 | 1524.89 |
| 30 | 193.000 | 1553.33 | 67 | 196.700 | 1524.11 |
| 31 | 193.100 | 1552.52 | 68 | 196.800 | 1523.34 |
| 32 | 193.200 | 1551.72 | 69 | 196.900 | 1522.56 |
| 33 | 193.300 | 1550.92 | 70 | 197.000 | 1521.79 |
| 34 | 193.400 | 1550.12 | 71 | 197.100 | 1521.02 |
| 35 | 193.500 | 1549.32 | 72 | 197.200 | 1520.25 |
| 36 | 193.600 | 1548.51 | 73 | 197.300 | 1519.48 |
| 37 | 193.700 | 1547.72 | | | |

DWDM INTRA-CAVITY LASER DEVICE

CROSS-REFERENCE TO RELATED APPLICATIONS

This application is a continuation of copending International Application No. PCT/EP2020/086482, filed Dec. 16, 2020, which is incorporated herein by reference in its entirety, and additionally claims priority from European Application No. 19217129.6, filed Dec. 17, 2019, which is also incorporated herein by reference in its entirety.

TECHNICAL FIELD

Embodiments of the present disclosure relate to a Dense Wavelength Division Multiplex (DWDM) intra-cavity laser device, and in particular to a DWDM intra-cavity laser device comprising DWDM-filter with an intra-cavity ring resonator arranged between two gratings, wherein said DWDM intra-cavity laser device is tunable in a discrete manner such that the free spectral range of the ring resonator matches a predetermined fixed wavelength spacing grid, for example the ITU-grid (ITU: International Telecommunication Union).

BACKGROUND OF THE INVENTION

For coherent dense wavelength-division multiplexing (DWDM), tunable lasers are of advantage over fixed wavelength lasers. Tunable lasers may have an advantage to realize cost effectiveness by realizing flexible and sliceable channels compared to fixed wavelength lasers. Tunable lasers may provide for wavelength tuning over the C-band and narrow linewidth for low phase noise. [1-1]

Adaptation to the ITU channels may be one of several interests regarding tunable lasers. For DWDM applications the wavelength of tunable lasers have to be exactly tuned to an equal wavelength grid, the so-called ITU grid having a frequency grid spacing of, e.g. 50 GHz, 100 GHz or 200 GHz. Therefore a tight control and fine tuning of the wavelength is desired. To match the ITU grid, external Fabry-Perot (FP) etalons are generally used as a filter with a free spectral range (FSR) corresponding to the ITU grid. After passing through the filter, a photo detector monitors the signal to find the accurate wavelength. [1-2, 1-3].

However, most of the published approaches are based on fiber or free space optics. So bulky modules and thus expensive packaging is needed.

In some approaches, Coupled Cavity Lasers (CCLs) are used where the cavity length has been optimized to match the 100 GHz. These lasers consist of two cavities coupled with one reflector. One cavity length is matched to the 100 GHz, therefore a control of the second cavity generates wavelength tuning automatically matched to the ITU 100 GHz grid [1-4]. However, because of the long active cavity and thus high optical losses in said CCLs, no narrow linewidth values can be expected here.

Wide wavelength tuning is commonly realized by using the Vernier effect, which utilizes two comb-like filters, e.g. two periodic transmission/reflection combs, with different periodicity to select different wavelengths with extended tuning range, which covers the C-band and could potentially also cover e.g. C+L band. For the filters, e.g. a Bragg grating based on either one of sampled gratings (SG), super-structure gratings (SSG) and ring resonators (RR) may be used.

Most of commercially available widely tunable lasers are using SG or SSG based tunable lasers because of the maturity of the technology and the advantage of monolithic III-V integration [1-5, 1-6, 1-7, 1-8]. However, there is a limitation of a linewidth improvement to sub-kHz with III-V material because of a difficulty of realizing the gratings with an high quality (Q) factor. SG-DBR based lasers are reported in [1-5] over the full C-band with a lower linewidth of 100 kHz. This laser, however, contains an additional filter to decrease a value of side mode suppression (SMSR). SSG-DBR lasers may offer a tuning range of 40 nm but linewidth is 400 kHz [1-9].

Recently, there has been a great interest in ring resonators (RRs) because of their long effective length, allowing for a high Q factor filter in order to achieve a narrow linewidth. Because of the low propagation loss, so far silicon related materials based RRs are of advantage, e.g. silicon, silicon nitride and silicon oxide [1-10]. However, these materials have an indirect bandgap only and thus entail a hybrid integration with III-V active sections as a light source. This brings about extra fabrication processes for a wafer bonding or butt coupling and thus increased fabrication costs.

Different variants of RR-based III-V lasers have been investigated in the past but the resulting performance usually was worse than with silicon based RRs because of the relatively higher propagation loss.

As an example, reference [1-11] proposes a Fabry-Perot (FP) laser with a double ring resonator based on InGaAsP/InP, which covers 24 nm tuning with side mode suppression of over 40 dB. For the Vernier effect, the RRs are optimized to cover a wide tuning range, however it entails a tight radius of the RRs below 15 µm. However, as a drawback, the small radius generates leakage of light resulting in waveguide bending losses higher than 10 dB/cm, which broadens the linewidth of the lasers.

In [1-12] and [1-13] RRs and gratings may be used for the Vernier effect but these devices still suffer from the high waveguide bending losses in III-V based materials, as described above.

To improve the loss issue, larger RRs may be used as a wavelength filter. Devices with such large RR and with three asymmetric Mach-Zehnder interferometer (AMZI) show 74.3 nm tuning range with a linewidth of 363 kHz. However, this device suffers from a very large footprint of 3.65×0.9 $mm^2$ and the obtained linewidth is still too large for coherent modules, e.g. QPSK and 16-QAM [1-14].

Three section DBR lasers with an intra-cavity RR show a narrow linewidth of 63 kHz. They have been optimized for single mode operation by controlling the free spectral range to match the full-width half maximum of the DBR reflection. However, the wavelength is fixed and, thus, not tunable [1-15]. Furthermore in reference [1-15] the laser output suffers from a high propagation loss in the front grating.

Summarizing, widely tunable lasers having a narrow linewidth are desired.

However, generally there is a difficulty to design lasers with very narrow linewidth, which arises from the restricted Q factor of the gratings. As described in [2-2], phase noise broadens the laser linewidth. This can be improved by using a larger cavity length with low propagation loss. However, increasing the cavity length reduces the longitudinal mode spacing, which on the other hand then entails a high Q factor of DBR sections to operate single mode. Longer DBRs with low coupling coefficient in principle offer such a high Q factor. However current electron-beam lithography systems do not allow to pattern DBRs with lengths exceeding 1 mm. Furthermore the propagation loss is increased in such long DBRs. In conclusion long DBRs are no means to achieve a narrow optical linewidth.

In addition, wide wavelength tuning is commonly realized by using the Vernier principle that may be based on gratings or ring resonators. From a cost perspective, gratings may be of advantage due to their maturity of processing, e.g. III-V integration. However, gratings with high Q-factor are difficult and, thus, expensive to produce. Ring resonators instead may provide a high Q-factor. In particular, silicon based RRs have a desired Q-factor. However, they have an indirect bandgap only. Thus, hybrid integration with III-V active sections is necessary. Furthermore, a wide tuning range entails a small radius of the III-V ring resonator. However, a small radius leads to high waveguide bending losses which broaden the linewidth. Thus, ring resonators may have a trade-off between reducing the radius to provide a wide tuning range but with low bending losses providing a narrow line width. Very high Q ring resonators of a large radius also extend tuning range but it may entail more than three coupled ring resonators with extremely low loss waveguide.

Thus, it is desired to improve existing laser devices so as to provide a wide tuning range in combination with a narrow linewidth, which may be precisely tunable to a predetermined fixed wavelength spacing grid, e.g. to the ITU-grid.

SUMMARY

According to an embodiment, a tunable Dense Wavelength Division Multiplex (DWDM) intra cavity laser device may have: a first optical wave guide having a first optical grating section, a second optical wave guide having a second optical grating section, an active gain section spatially separated from the second optical grating section and a tunable phase section, and a DWDM-filter having an intra-cavity ring resonator located between the first optical wave guide and the second optical wave guide for coupling optical waves between the first and second optical wave guides, wherein the tunable laser device is tunable in a discrete manner, wherein a length of the ring resonator is selected such that the free spectral range of the ring resonator matches a wavelength spacing of a predetermined fixed wavelength spacing grid.

The inventive tunable DWDM intra-cavity laser device comprises, inter alia, a first optical wave guide comprising a first optical grating section and a second optical wave guide comprising a second optical grating section. The tunable DWDM laser may further comprise a phase section and an active gain section being separated from the second optical grating section, which may characterize a DBR-laser (DBR: Distributed Bragg Reflector) and differentiate the same from a DFB-laser (DFB: Distributed Feedback). The inventive tunable DWDM laser may further comprise a DWDM-filter comprising an intra-cavity ring resonator located between the first optical wave guide and the second optical wave guide for coupling optical waves between the first and second optical wave guides. The tunable laser device is tunable in a discrete fashion, wherein the tuning may depend on a length of the ring resonator. Thus, according to the invention, the length of the ring resonator is selected such that the free spectral range (FSR) of the ring resonator exactly matches a predetermined fixed wavelength spacing grid. In other words, the ring resonator may be matched to said predetermined fixed wavelength spacing grid by having an FSR which allows the ring resonator to exactly "jump" into at least one grid point of the predetermined grid. A wavelength/frequency grid is a table of all the central frequencies (and corresponding wavelengths) of channels allowed in a communication system.

According to an embodiment, at least one of the first optical grating section, the second optical grating section and the phase section may be tunable for fine-tuning the optical wavelength so as to switch, in discrete fixed wavelength-spacing-steps, between two or more channels inside the predetermined fixed wavelength spacing grid to which the ring resonator is matched.

The predetermined fixed wavelength spacing grid may, for instance, correspond to the ITU-grid. According to some embodiments, the invention may provide an innovative tunable laser concept using an intra cavity RR that allows for an automatic matching to the ITU-grid. This innovative concept may comprise a 4-section DBR laser for the Vernier effect, such as SG or SSG DBR lasers, but it additionally offers a narrow optical linewidth.

Said ITU-grid may be the most common frequency grid used for fiber-optic communication. The ITU-grid is used for channel spacing in Dense Wavelength Division Multiplexing (DWDM) at wavelengths around 1550 nm and is defined by ITU-T G.694.1. The ITU-grid is defined relative to 193.1 THz and extends from 191.7 THz to 196.1 THz with 100 GHz spacing. While defined in frequency, the grid is often expressed in terms of wavelength, in which case it covers the wavelength range of 1528.77 nm to 1563.86 nm with approximately a 0.8 nm channel spacing. For practical purposes, the ITU-grid has meanwhile been extended to cover 186 THz to 201 THz and subdivided to provide 50 GHz (0.4 nm), 25 GHz (0.2 nm) and even 12.5 GHz (0.1 nm) spaced grids.

According to an embodiment, the ring resonator may comprise a length in the range between 416 μm and 3330 μm corresponding to a radius between 66 μm to 530 μm. The ring resonator may further provide for a narrow optical line width of the output light below 200 kHz, or below 150 kHz, or even below 100 kHz. The ring resonator may provide a tuning range of at least 20 nm, or of at least 30 nm or of at least 40 nm and above.

Accordingly, the herein described innovative concept may provide a discrete automatic tuning to the ITU-grid, while nowadays conventional tunable lasers entail a tight and complicated control to exactly match the grid. The innovative integrated DWDM filter, which is realized with a ring resonator, may allow to filter the signal for matching the ITU-grid inherently. According to the invention, the ring resonator may provide a longer effective length of the cavity with a high Q-factor to improve the linewidth and preserve the tuning ability of the laser.

BRIEF DESCRIPTION OF THE DRAWINGS

In the following, embodiments of the present disclosure are described in more detail with reference to the figures, in which.

DETAILED DESCRIPTION OF THE INVENTION

Equal or equivalent elements or elements with equal or equivalent functionality are denoted in the following description by equal or equivalent reference numerals.

Method steps which are depicted by means of a block diagram and which are described with reference to said block diagram may also be executed in an order different from the depicted and/or described order. Furthermore, method steps concerning a particular feature of a device may be replaceable with said feature of said device, and the other way around.

Figure 3:
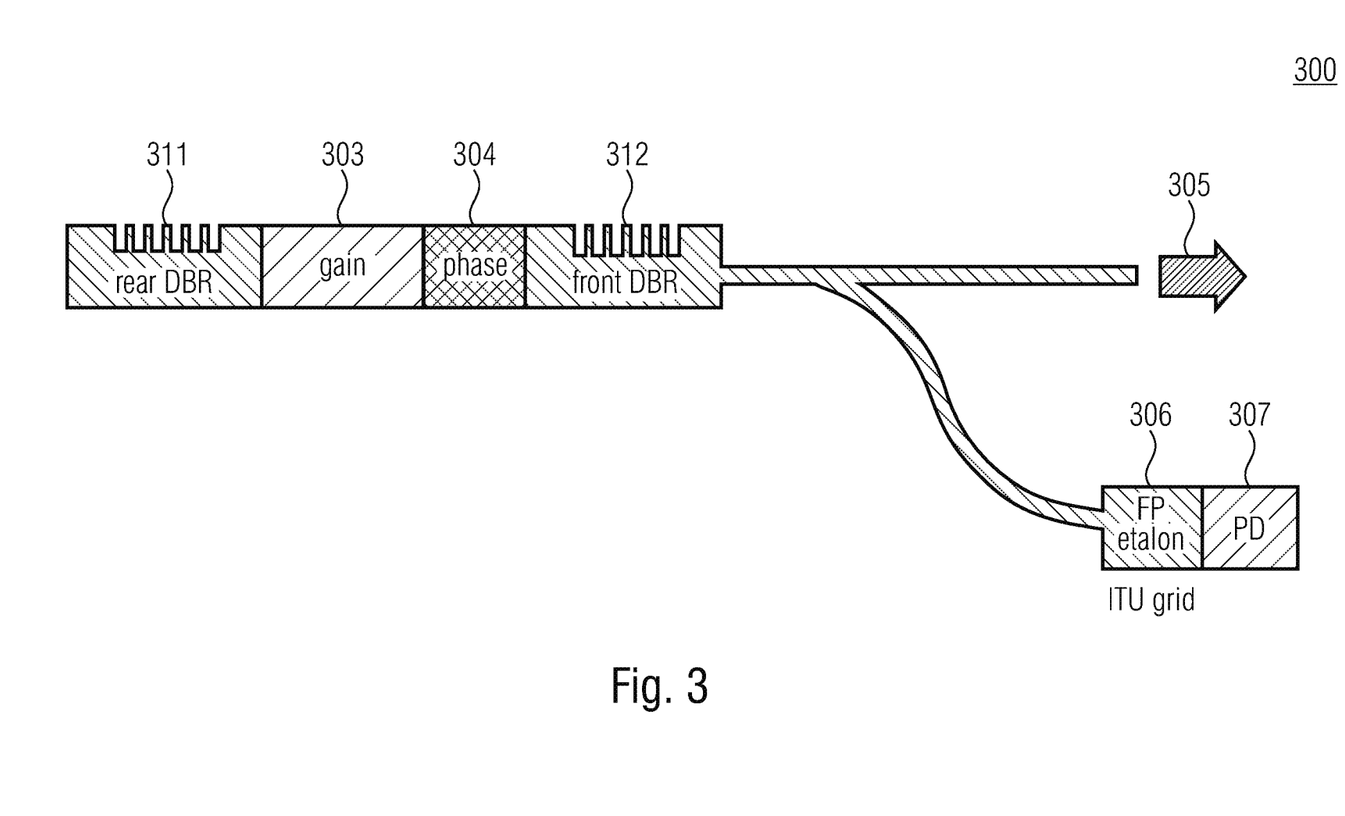
FIG. 3 shows a schematic view of a four-section DBR laser with an external ITU grid FP etalon according to the known technology.

Initially, FIG. 3 shows a tunable DBR laser according to the known technology. Said Figure shows a conventional InP based 4-section DBR tunable laser 300 with an external etalon filter 306. The known laser 300 is composed of a gain 303, a phase 304, a rear DBR section 311 and a front DBR section 312 coupled to an output 305. The known laser 300 contains an external ITU grid FP etalon filter 306 with a photo detector 307 to detect the signal. However, as mentioned above, bulky modules are used to implement the external FP etalon filter.

Alternatively, the known technology also knows photonic integrated circuits (PIC). In case of photonic integrated circuits (PIC), e.g. in reference [2-1], a quarter lambda DBR is used as a wavelength filter. However this works for one single wavelength only. An adjustment to the full ITU grid is not possible.

Figure 4:
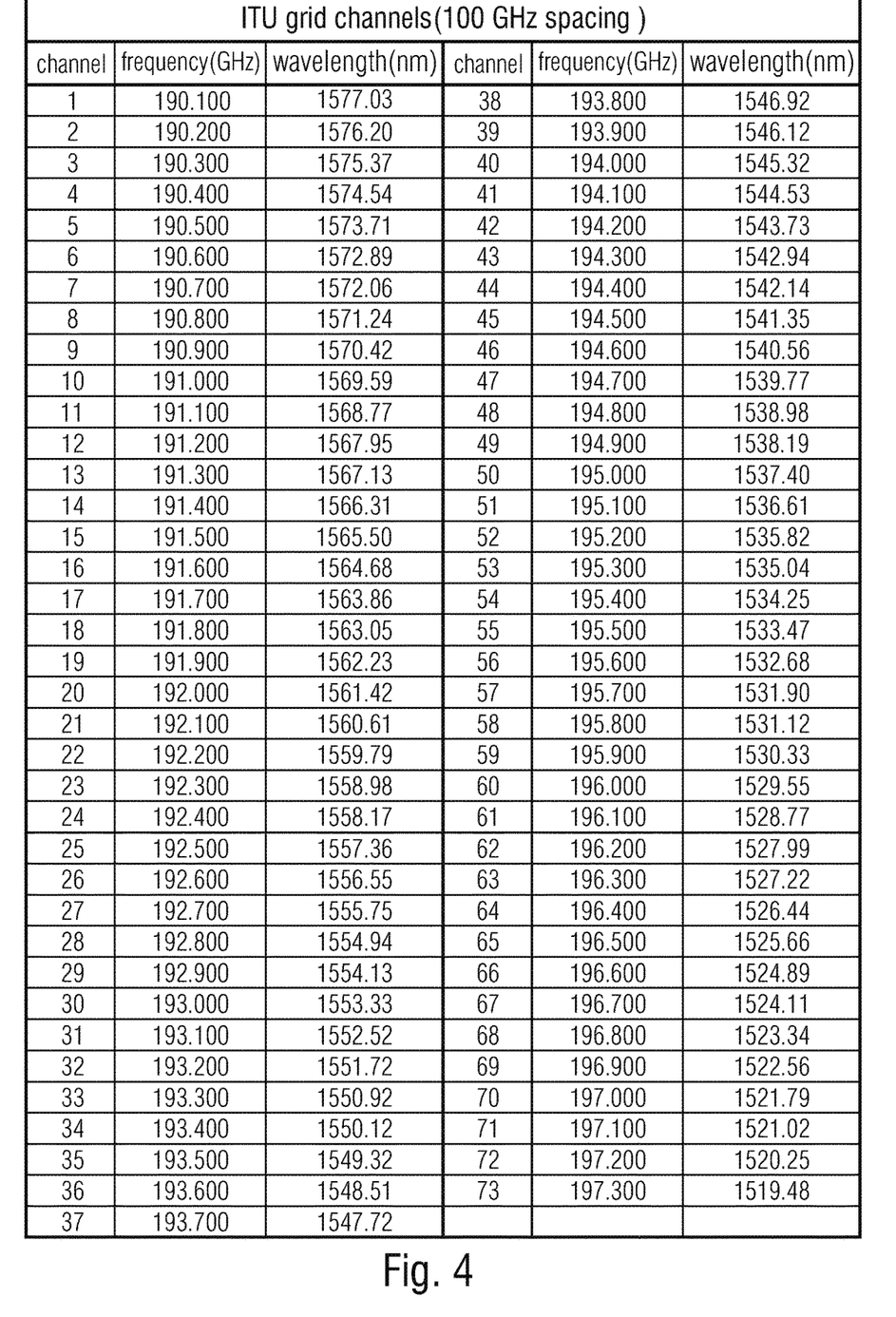
FIG. 4 shows a table containing one standardized ITU grid having a frequency spacing of 100 GHz.

FIG. 4 shows a table of an ITU grid with 100 GHz spacing. As can be seen, the ITU grid varies around a basis wavelength of 1555.75 nm with value ranges of wavelengths above and below 1555.75 nm. The ITU grid may comprise 73 different channels ranging from 190.100 GHz to 197.300 GHz with a frequency spacing of 100 GHz between each channel, which may correspond to a wavelength spacing of approximately 0.8 nm. Accordingly, this depicted ITU grid corresponds to a fixed wavelength spacing grid having a fixed wavelength spacing of 0.8 nm. The predetermined fixed wavelength spacing grid may also be expressed in terms of frequency spacing, which would then correspond to a predetermined fixed frequency spacing grid. In this example shown in FIG. 4, the depicted ITU grid would correspond to a predetermined fixed frequency spacing grid having a fixed frequency spacing of 100 GHz.

Figure 1:
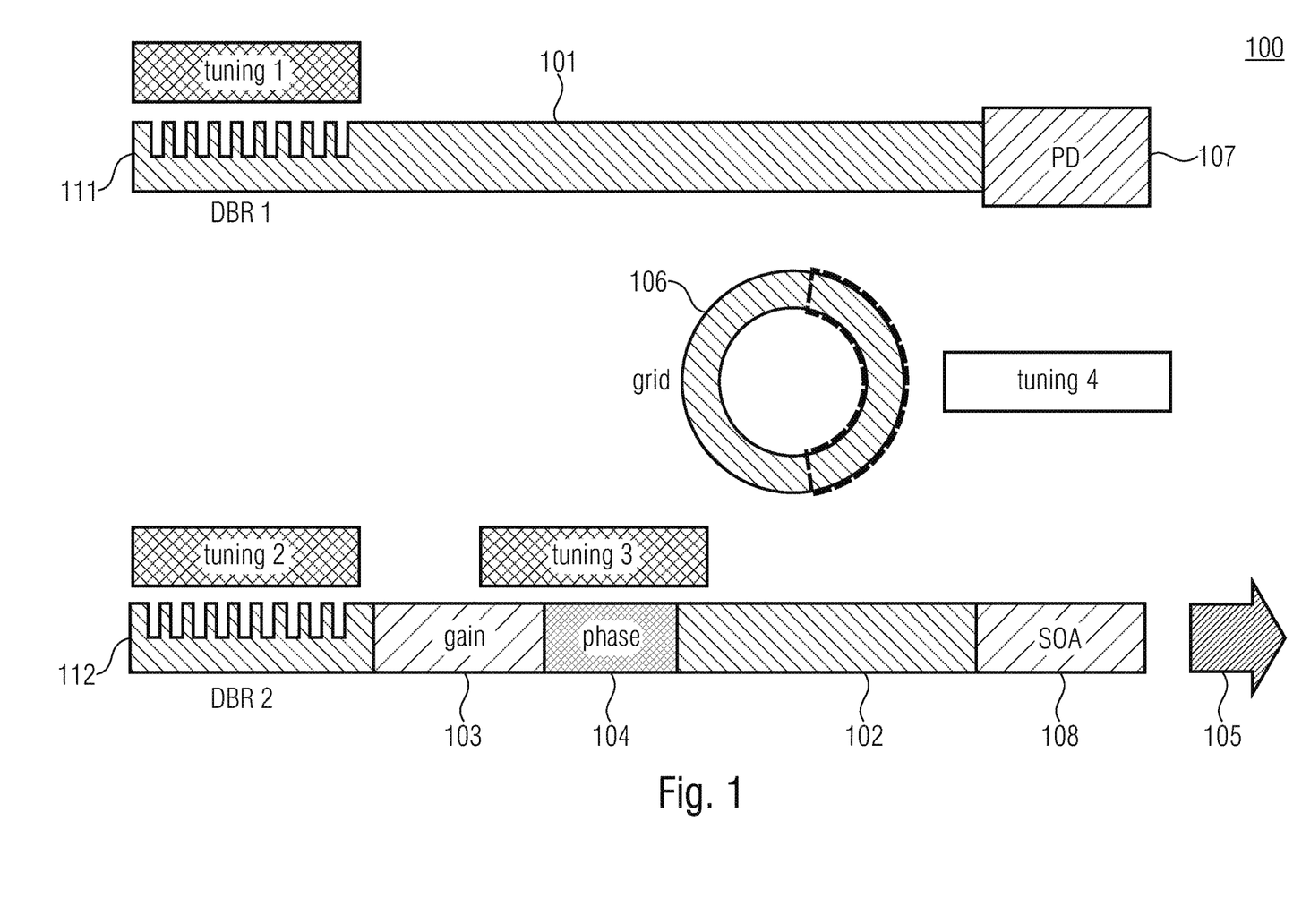
FIG. 1 shows a schematic view of a tunable DWDM intra cavity laser device according to an embodiment.

FIG. 1 now shows an embodiment of a tunable DWDM intra-cavity laser device 100 according to the present invention which is configured to automatically tune into such a predetermined fixed wavelength spacing grid, wherein tuning may be accomplished in a discrete manner, i.e. in discrete steps.

The tunable DWDM intra-cavity laser device 100 may comprise a first optical wave guide 101 comprising a first optical grating section 111 and a second optical wave guide 102 comprising a second optical grating section 112. The tunable DWDM intra-cavity laser device 100 may further comprise an active gain section 103 that is spatially separated from the second optical grating section 112 corresponding to a DBR-laser. The tunable DWDM intra-cavity laser device 100 may further comprise a phase section 104. Light may be coupled out from the second optical wave guide 102 at a light output section of the laser cavity, as indicated by arrow 105. So far, the tunable DWDM intra-cavity laser device 100 may comprise the structure of a 4-section DBR laser.

The first optical grating section 111 may be arranged in the first optical wave guide 101. The second optical grating section 112 may be arranged in the second optical wave guide 102. The gain section 103 and the phase section 104 may also be arranged in the second optical wave guide 102. The optical wave guides 101, 102 may be passive, i.e. without an active layer. The gain section 103 may, however, comprise an active layer.

The tunable DWDM intra-cavity laser device 100 may optionally comprise an intra-cavity photo detector 107 that may be arranged in the first optical wave guide 101. Further optionally, the tunable DWDM intra-cavity laser device 100 may comprise a semiconductor optical amplifier (SOA) at the light output section 105 of the cavity.

The tunable DWDM intra-cavity laser device 100 may further comprise a DWDM-filter comprising an intra-cavity ring resonator 106 being located between the first optical wave guide 101 and the second optical wave guide 102 for coupling optical waves between the first and second optical wave guides 101, 102. Coupling components between the optical waveguides 101, 102 and the ring resonator 106 may be at least one of directional couplers or MMIs. For example, for coupling between the first optical waveguide 101 and the ring resonator 106, either 1×2 or 2×2 MMIs are possible. 1×2 MMI couplers have the advantage of a compact footprint but in this case no photo detectors may be integrated in the tunable laser. Accordingly, the tunable DWDM intra-cavity laser device 100 may comprise the structure of a 4-section DBR laser additionally comprising a ring resonator 106.

According to the herein described innovative principle, the tunable laser device 100 may be tunable in a discrete fashion. Said discrete tuning may depend on the length (or radius) of the ring resonator 106, wherein the length is selected such that the free spectral range (FSR) of the ring resonator 106 matches a predetermined fixed wavelength spacing grid. Said predetermined fixed wavelength spacing grid may correspond to an ITU grid with a fixed wavelength spacing of at least one of 12.5 GHz, 25 GHz, 50 GHz, 100 GHz or 200 GHz. For example, the ring resonator 106 may comprise a length in the range between 416 μm and 3330 μm. For instance, the length of the ring resonator 106 may correspond to 3330 μm to be matched to the ITU grid with 25 GHz channel spacing, or the length of the ring resonator 106 may correspond to 1665 μm to be matched to the ITU grid with 50 GHz channel spacing, or the length of the ring resonator 106 may correspond to 832 μm to be matched to the ITU grid with 100 GHz channel spacing, or the length of the ring resonator 106 may correspond to 416 μm to be matched to the ITU grid with 200 GHz channel spacing.

In other words, the innovative tunable DWDM intra-cavity laser device 100 may provide for an automatic matching of the wavelength to the ITU grid. In this concept, there may be an additional ring resonator 106 implemented into the DBR laser device 100. The length of the ring resonator 106 may be optimized so that the FSR of the ring resonator 106 is equal to the wavelength spacing of the ITU grid. Therefore, the ring resonator 106 may act as a dedicated DWDM filter complying with the ITU standard. According to the innovative principle, the wavelength tuning works like in common tunable lasers with the decisive difference that the tuning is discrete because of the FSR of the ring resonator 106, which acts as the DWDM filter. In other words, the wavelength tuning "jumps" by discrete steps to the ITU grid owing to the intra DWDM filter provided by the particularly matched ring resonator 106.

Figure 2:
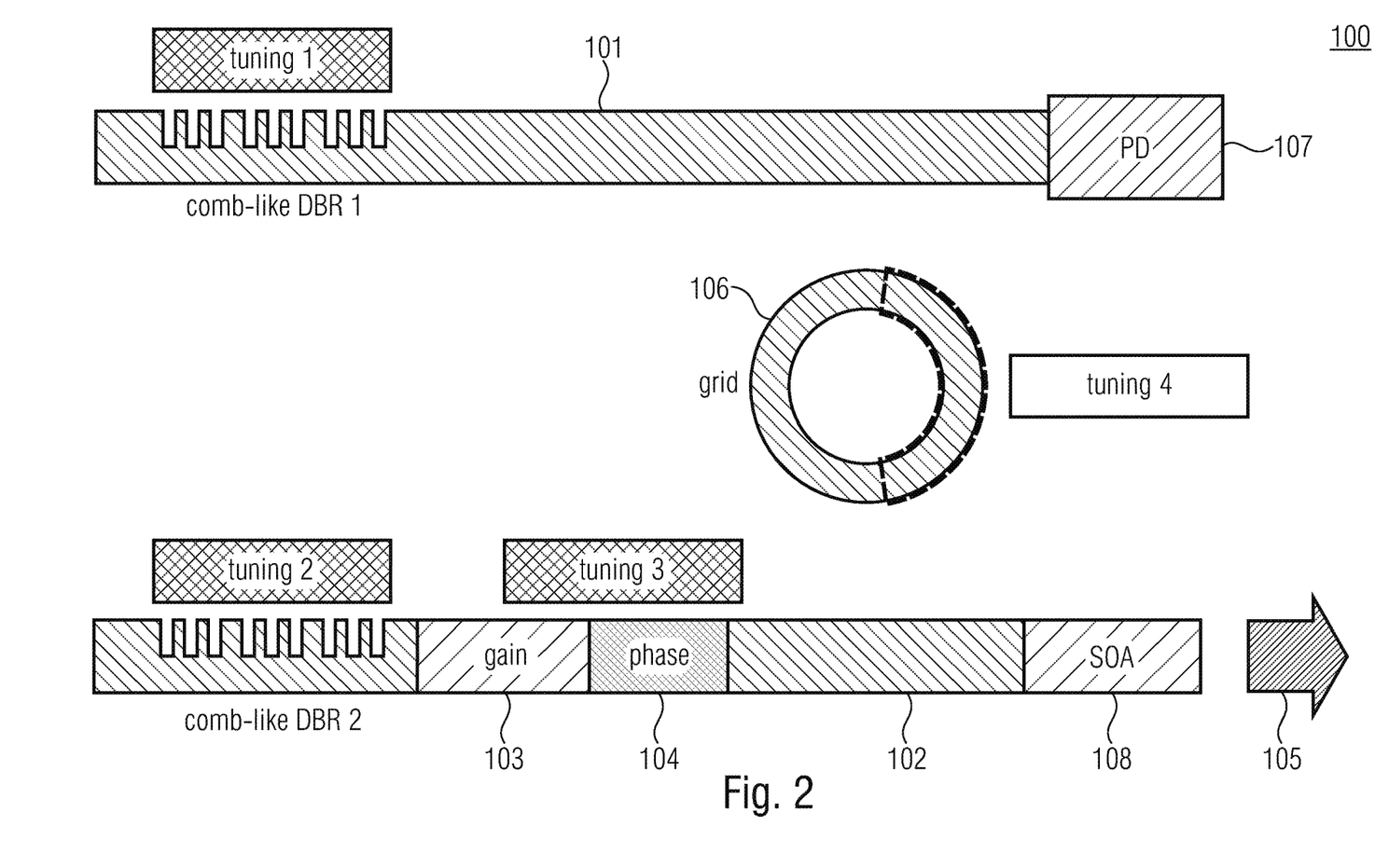
FIG. 2 shows a schematic view of a tunable DWDM intra cavity laser device according to a further embodiment.

FIG. 2 shows a further embodiment of a tunable DWDM intra-cavity laser device 100 according to the present invention. This DWDM laser device 100 may substantially correspond to the first embodiment described above with reference to FIG. 1. Thus, elements and features having the same or similar function are provided with the same reference numerals.

However, in the embodiment as shown in FIG. 2, the first optical grating section 111 may comprise a comb-like optical grating and/or the second optical grating section 112 may comprise a comb-like optical grating. In particular, at least one of the first optical grating section 111 and the second optical grating section 112 may comprise a sampled grating (SG) or a super-structure grating (SSG).

The optical grating sections 111, 112 may comprise at least one of normal DBR gratings, sampled gratings (SG), or super-structure gratings (SSG) or variations thereof. The optical grating sections 111, 112 may be tuned by thermal heating and/or by means of applied voltage, see boxes labeled with "Tuning 1" and "Tuning 2" in FIGS. 1 and 2. The same is true for the phase section 104 which may be employed for wavelength tuning, see box labeled with "Tuning 3" in FIGS. 1 and 2.

In both embodiments (FIG. 1 and FIG. 2), up to four tuning possibilities may be available in the tunable DWDM intra-cavity laser device 100. For example, the ring resonator 106 itself may be matched to at least one predetermined fixed wavelength grid, which may also be referred to as grid-setting, by selecting the length of the ring resonator 106 so that its FSR corresponds to the respective grid, see box labeled with "Tuning 4" in FIGS. 1 and 2. Accordingly, the DWDM intra-cavity laser device 100 may be coarsely tuned in that the ring resonator 106 may be matched to at least one predetermined fixed wavelength spacing grid, e.g. to an ITU-grid with 100 GHz channel spacing.

The DWDM intra-cavity laser device 100 may also be fine-tuned by means of at least one of the first optical grating section 111, the second optical grating section 112 and the phase section 104 in order to switch between different channels inside the grid. For example, at least one of the first optical grating section 111, the second optical grating section 112 and the phase section 104 may be tunable (separately or in combination with each other) for fine-tuning the optical wavelength so as to switch, in discrete fixed wavelength-spacing-steps, between two or more channels inside the predetermined fixed wavelength spacing grid to which the ring resonator 106 is matched.

For employing the above mentioned fine-tuning, the first optical grating section 111 and the second optical grating section 112 may be mutually tunable for providing a Vernier effect for switching between two or more channels inside the predetermined fixed wavelength spacing grid.

Summarizing, the ring resonator 106 itself may be used for coarse tuning (grid-setting). However, as mentioned above, this tuning possibility of the ring resonator 106 may not be used for the above described fine-tuning of the optical wavelength so as to switch between two or more channels inside the predetermined fixed wavelength spacing grid. Since the ring resonator 106 itself may not be needed for the wavelength fine-tuning, the ring resonator 106 may not be involved in the fine-tuning of the optical wavelength and/or in providing the Vernier effect.

However, the ring resonator 106 may comprise a further tuning option that may be used to fine-tune the ring resonator 106 itself, wherein said further tuning option may be applied to the ring resonator 106 for compensating for fabrication tolerances to exactly match the predetermined grid, e.g. the ITU grid. For example, the ring resonator 106 may be fine-tuned its free spectral range (FSR) so as to compensate for fabrication tolerances and to precisely match the predetermined fixed wavelength spacing grid. Because of the long cavity length of, e.g. more than 416 µm, a fabrication tolerance of ±100 nm may result in a small change of the FSR only. The expected FSR difference between target and real value may be below 1% and may be compensated by tuning the ring resonator 106.

As can be seen in FIGS. 1 and 2, in both embodiments the output power may be coupled from the ring resonator 106, not from a front DBR as in common DBR type lasers. Accordingly, the light output section 105 of the DWDM intra cavity laser device 100 may be grating-less.

The second optical grating section 112 may be provided as a rear grating arranged opposite the light-output section 105, wherein said rear grating 112 may be configured to reflect the optical waves inside the cavity. Thus, in the present invention, output power may not be coupled out from the rear DBR grating 112 but it may only be reflected by the rear DBR grating 112 and be coupled out from the ring resonator 106 instead. The omittance of a front grating helps to avoid power losses which may otherwise occur during the propagation through known front gratings. Optionally, the additional booster SOA amplifier 108 may further increase the output power of the DWDM intra cavity laser device 100.

In contrast to the known technology, a low loss propagation in the ring resonator 106 is feasible because the radius of the ring resonator 106 for 100 GHz or 200 GHz FSR is large enough to achieve a desired low loss propagation. This is due to the fact that in the herein described innovative concept the ring resonator 106 acts like a filter for narrow wavelength (e.g. 0.8 nm for 100 GHz), whereas the known ring resonators used for the Vernier effect use longer FSRs of more than a few nanometers.

Furthermore, due to its effective length, the ring resonator 106 of the herein described principle may provide for a narrow optical line width of the output light below 200 kHz. The herein described ring resonator 106 may increase the effective length of the cavity and may thus improve the linewidth. The high Q factor of ring resonator 106 with the Lorentzian filtering in combination with the DBRs 111, 112 may provide a strong mode selection for single mode operation.

Furthermore, as mentioned above, the known technology may suggest to use FP etalon filters for the grid-setting. However, as mentioned above, bulky modules are used to implement the external FP etalon filter. Thus, in the DWDM intra cavity laser device 100 according to the present invention an external-cavity Fabry-Perot etalon filter may be explicitly omitted. In other words, the DWDM intra cavity laser device 100 does not comprise a bulky external-cavity Fabry-Perot etalon filter.

Figure 5A:
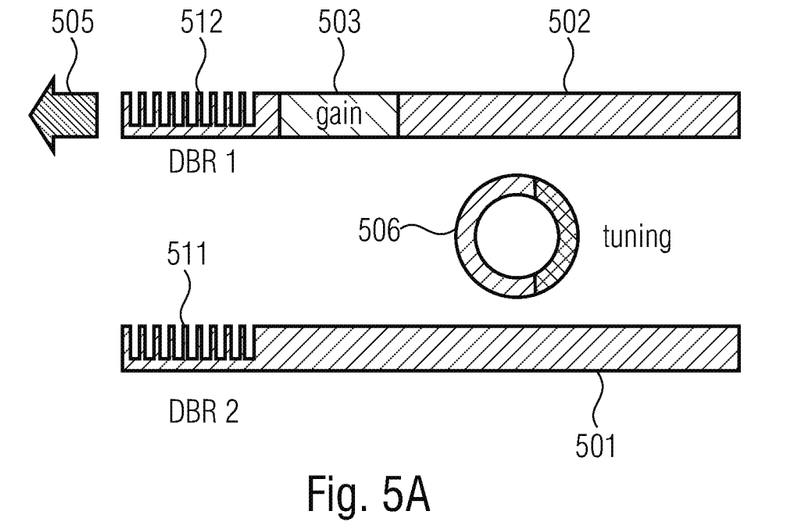
FIG. 5A shows a schematic view of a three-section DBR laser with passive ring and tunable ring resonator according to the known technology.
Figure 5B:
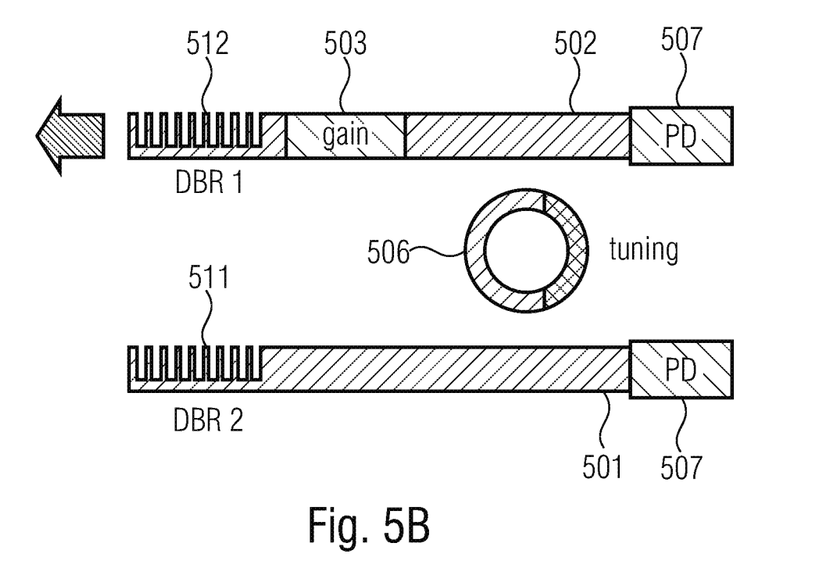
FIG. 5B shows a schematic view of a three-section DBR laser with passive ring and tunable ring resonator and additional photo detectors according to the known technology.

Further known technology (e.g. [2-1] and [2-3]) may also describe two grating sections and a ring resonator. However, the tuning mechanism and the purpose of the concepts differ from the present invention. FIGS. 5A and 5B show a structure of the references [2-1] and [2-3], respectively. They show a three-section DBR laser with a passive ring and a tunable ring resonator (FIG. 5A) and additionally with integrated photo detectors (FIG. 5B). The two gratings 511, 512 are purely passive sections, which means that the reflection is fixed. For wavelength tuning here the ring resonator 506 is used to shift the filter wavelength. However the tuning range amounts to 8 nm only because the Vernier effect cannot be used here. In reference [2-3], the photo detectors 507 are integrated to monitor wavelength and power of the laser and the tuning mechanism is identical to reference [2-1]. Moreover, the purpose of the laser is to achieve an athermal laser. Both of the lasers are based on silicon photonics with hybrid III-V integration.

The herein described innovative concept may apply standard monolithic InP processing for laser fabrication. No hybrid processes as e.g. wafer bonding, but joint coupling of external light sources are needed here.

Summarizing, the herein described innovative concept may provide a widely tunable laser device 100 integrated with an internal DWDM filter 106 for automatic matching to the ITU grid and with a narrow linewidth. The laser device 100 may basically correspond to a 4-section DBR laser with an additional intra cavity ring resonator 106, and which may be controlled by 3-sections only.

Different variants may be possible:
tunable multi-section DBR-lasers 100
tunable multi-section SG- and/or SSG- and/or supermode DBR(DS-DBR) lasers 100
tunable arrays of lasers 100
above mentioned lasers 100 using ridge-waveguide structure
above mentioned lasers 100 using buried-heterostructure
above mentioned lasers 100 integrated in photonic integrated circuits
realized on InP- or GaAs-substrates For tunable light sources addressing the ITU grid the herein described innovative tunable laser device 100 may provide simple tuning and excellent performance. Possible industrial applications may be given in any ITU grid based Optical Network, in particular in Passive Optical Networks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1-1] V. Lai, et al., "Extended C-Band Tunable Multi-Channel InP-Eased Coherent Transmitter PICs", J. Light. Technol. 35(7), 1320-1327 (2017)
[1-2] T. Haber, et al, "Tunable Erbium-Doped Fiber Ring Laser Precisely Locked to the 50-GHz ITU Frequency Grid", IEEE Photon. Technol. Lett. 12(11), 1456-1453 (2000)
[1-3] B. Hammond, et al., "Integrated Wavelength Locker for Tunable Laser Application", The 15th Annual Meeting of the IEEE Lasers and Electro-Optics Society, WO1
[1-4] S. Cheung, "High-Speed, Directly-Modulated Widely Tunable 1310 nm Coupled Cavity Laser Via Multimode Interference", J. Light. Technol. 37(9), 2133-2139 (2019)
[1-5] M. C. Larson, "Narrow linewidth tunable DER lasers", 2016 International Semiconductor Laser Conference (ISLC), TuC2 (2016)
[1-6] FINISAR, Modulated Grating Y-Branch laser, https://www.laserdiodesource.com/laser-diode-product-page/528nm-1563nm-20mW-butterfly-tunable-Finisar
[1-7] A. Carter, et al., "TUNABLE LASER", US Patent 2004/0218638 A1
[1-8] M. L. Mashanovitch. "INTEGRATED INTERFEROMETRIC OPTICAL TRANSMITTER", U.S. Pat. No. 9,344,196 B1
[1-9] H. Ishii, et al, "Narrow Spectral Linewidth Under Wavelength Tuning in Thermally Tunable Super-Structure-Grating (SSG) DER Lasers", IEEE J. Sel. Topics Quantum Electron., 1(2), 401-407 (1995)
[1-10] T. Komljienovic, et al., "Widely-Tunable Ring-Resonator Semiconductor Lasers", Appl. Sci. 7(7), 732 (2017)
[1-11] S. Matsuo and T. Segawa, "Microring-Resonator-Based Widely Tunable Lasers", IEEE J. Sel. Topics Quantum Electron., 15(3), 545-554 (1995)
[1-12] T. Kato and Yokohama-shi, "SEMICONDUCTOR LIGHT-EMITTING DEVICE WITH TUNABLE EMISSION WAVELENGTH", US Patent 2009/0092159 A1 (2009)
[1-13] R. Jones, "EXTERNAL CAVITY, WIDELY TUNABLE LASERS AND METHODS OF TUNING THE SAME", U.S. Pat. No. 6,959,028 B2
[1-14] S. Latkowski, et al., "Novel Widely Tunable Monolithically Integrated Laser Source", IEEE Photonics J. 7(6), (2015)
[1-15] S. Andreou, et al., "Monolithically integrated InP-based DBR lasers with an intra-cavity ring resonator", Opt. Express 27(19), 26281-26294 (2019)
[2-1] J. Bovington, et al., "Athermal laser design", Opt. Express 22(16), 19357-19364 (2014)
[2-2] C. H. Henry, "Theory of the linewidth of semiconductor lasers", IEEE. J. Quantum. Electron, 18(2), 259-264 (1982)
[2-3] S. Keyvaninia, et al., "Demonstration of a heterogeneously integrated III-V/SOI single wavelength tunable laser", Opt. Express 21(3), 3784-3792 (2013)

The invention claimed is:

1. A tunable Dense Wavelength Division Multiplex (DWDM) intra cavity laser device comprising:
a first optical wave guide comprising a first optical grating section,
a second optical wave guide comprising a second optical grating section, an active gain section spatially separated from the second optical grating section and a phase section,
a DWDM-filter comprising an intra-cavity ring resonator located between the first optical wave guide and the second optical wave guide for coupling optical waves between the first and second optical wave guides,
wherein a length of the ring resonator is selected such that the free spectral range of the ring resonator matches a wavelength spacing of a predetermined fixed wavelength spacing grid,
wherein the tunable laser device is tunable in a discrete manner in that wherein at least one of the first optical grating section, the second optical grating section and the phase section are tunable for fine-tuning the optical wavelength so as to switch, in discrete fixed wavelength-spacing-steps, between two or more channels inside the predetermined fixed wavelength spacing grid to which the ring resonator is matched, and wherein the first optical grating section and the second optical grating section are mutually tunable for providing a Vernier effect for switching between the two or more channels.

2. The tunable DWDM intra cavity laser device according to claim 1,
wherein the predetermined fixed wavelength spacing grid corresponds to a standardized ITU grid (ITU: International Telecommunication Union), namely to ITU-T G.694.1, with a fixed wavelength spacing of at least one of 12.5 GHz, 25 GHz, 50 GHz, 100 GHz or 200 GHz.

3. The tunable DWDM intra cavity laser device according to claim 1,
wherein the ring resonator is configured to not contribute to the fine-tuning of the optical wavelength and/or wherein the ring resonator is configured to not contribute to the Vernier effect.

4. The tunable DWDM intra cavity laser device according to claim 1,
wherein the ring resonator itself is tunable inside a range of ±10%, or ±1%, around its free spectral range so as to compensate for fabrication tolerances and to precisely match the predetermined fixed wavelength spacing grid.

5. The tunable DWDM intra cavity laser device according to claim 1,
wherein at least one of the first optical grating section, the second optical grating section, the phase section and the ring resonator are tunable by means of thermal power or electrical power.

6. The tunable DWDM intra cavity laser device according to claim 1,
wherein at least one of the first optical grating section and the second optical grating section comprises a sampled grating or a super-structure grating, or wherein each one of the first optical grating section and the second optical grating section comprises a sampled grating or a super-structure grating.

7. The tunable DWDM intra cavity laser device according to claim 1,
wherein a light output section of the laser device is grating-less,
wherein the second optical grating section is provided as a rear grating arranged opposite the light-output section, wherein said rear grating is configured to reflect the optical waves inside the cavity.

8. The tunable DWDM intra cavity laser device according to claim 1,
wherein a semiconductor optical amplifier is arranged at a light output section.

9. The tunable DWDM intra cavity laser device according to claim 1,
wherein the tunable DWDM intra cavity laser device does not comprise an external-cavity Fabry-Perot etalon filter as a filter to match the predetermined fixed wavelength spacing grid.

10. The tunable DWDM intra cavity laser device according to claim 1,
wherein the ring resonator comprises a length in the range between 416 μm and 3330 μm, or a length of at least one of 416 μm ±10% or 832 μm ±10% or 1665 μm ±10% or 3330 ±10%.

11. The tunable DWDM intra cavity laser device according to claim 1,
wherein the ring resonator provides for a narrow optical line width of the output light below 200 kHz.

12. The tunable DWDM intra cavity laser device according to claim 1,
wherein the first optical wave guide is a passive wave guide.

13. The tunable DWDM intra cavity laser device according to claim 1,
wherein the first optical wave guide comprises a photo detector.

* * * * *